United States Patent [19]

Barbini et al.

[11] 4,343,979
[45] Aug. 10, 1982

[54] DEVICE FOR RAPID DEFREEZING OF FROZEN OR DEEP-FROZEN PRODUCTS

[75] Inventors: Spartacus Barbini, Chaville; Michel Jolion, Avon, both of France

[73] Assignee: Electricite de France (Service National), Paris, France

[21] Appl. No.: 7,206

[22] Filed: Jan. 29, 1979

Related U.S. Application Data

[63] Continuation-in-part of Ser. No. 821,922, Aug. 4, 1977, abandoned.

[51] Int. Cl.³ .......................... H05B 6/78; A23L 3/36
[52] U.S. Cl. ...................... 219/10.55 A; 219/10.55 R; 239/703; 239/695; 361/228; 165/17; 99/451
[58] Field of Search ................ 219/10.55 R, 10.55 A, 219/10.55 M, 10.55 F; 99/451, 483; 426/100, 237, 241–243; 165/2, 17, 30; 34/1, 5; 239/690–700, 701–708; 62/171, 304; 361/228; 118/621, 300

[56] References Cited

U.S. PATENT DOCUMENTS

| | | | |
|---|---|---|---|
| 2,859,534 | 11/1958 | Copson | 219/10.55 R |
| 2,955,565 | 10/1960 | Schotland | 239/707 X |
| 3,009,442 | 11/1961 | Juvinall | 239/695 X |
| 3,061,198 | 10/1962 | Kerr et al. | 239/703 X |
| 3,147,137 | 9/1964 | Glass et al. | 239/695 X |
| 3,339,840 | 9/1967 | Point | 239/695 X |
| 3,342,415 | 9/1967 | Point | 239/694 |
| 3,494,723 | 2/1970 | Gray | 219/10.55 R |
| 3,521,815 | 7/1970 | Szasz | 239/698 |
| 3,531,871 | 10/1970 | Sahara | 219/10.55 A X |
| 3,536,129 | 10/1970 | White | 219/10.55 M |

FOREIGN PATENT DOCUMENTS

| | | | |
|---|---|---|---|
| 1947738 | 7/1978 | Fed. Rep. of Germany | 219/10.55 A |
| 7113294 | 1/1975 | France | 62/171 X |
| 2353236 | 12/1977 | France | 219/10.55 A |

Primary Examiner—B. A. Reynolds
Assistant Examiner—Philip H. Leung
Attorney, Agent, or Firm—Pearne, Gordon, Sessions, McCoy & Granger

[57] ABSTRACT

Frozen or deep-frozen products transferred by a conveyor system within a furnace are subjected to radiation within the high-frequency or microwave range and to surface cooling which is carried out by electrostatic spraying of the products with cryogenic liquid consisting of liquid nitrogen or Freon R12.

3 Claims, 4 Drawing Figures

DEVICE FOR RAPID DEFREEZING OF FROZEN OR DEEP-FROZEN PRODUCTS

This invention which is a continuation-in-part of application Ser. No. 821,922, Aug. 4, 1977, now abandoned, relates to a device for rapid defreezing of frozen, deep-frozen or sharp-frozen products (agricultural products, food products, pharmaceutical products, medical products or the like) in which the action of high-frequency radiation is combined with the action of electrostatic spraying of cryogenic liquid.

It is known that defreezing of deep-frozen or frozen products consists in increasing the temperature of these latter from approximately −18° C. (or lower) to room temperature in order to permit consumption or to facilitate any further treatments which may be required. Especially in the case of agricultural food products, the abovementioned temperature increase or reheating process can take place in a natural manner by putting the product in contact with a ventilated atmosphere at a suitable temperature (positive, for example) or by immersing it in water which is maintained at a suitable temperature.

These methods are subject to a disadvantage in that they entail the need for a very long processing time. This arises from the fact that the reheating process takes place first at the surface which is in contact with the air or liquid, then in volume when the heat penetrates into the product. This heat penetration, however, depends on the thermal conductivity of the product and this is usually of a low order in the case of agricultural food products. The time required for full reheating of the product is therefore often prohibitive.

It is known on the other hand that the use of high-frequency waves or microwaves permits a considerable reduction in the defreezing time. In accordance with this known method, the product to be defrozen is subjected to intense radiation of suitable frequency (for example 27 MHz or 915 MHz or even 2450 MHz). The energy of the radiation is absorbed in the volume of the product and dissipated therein in the form of heat, thus resulting in a temperature rise of the product. The processing time is then extremely short and is of the order of a few minutes.

Nevertheless, the defreezing obtained by means of a method of this kind is very heterogeneous and this has the effect of limiting the use of the method to final temperatures below approximately 0° C. In fact, although the method achieves effective penetration of the waves into the volume to be reheated, they nevertheless undergo progressive attenuation as penetration takes place, with the result that a temperature gradient appears and the center of the product remains at a lower temperature than the surface. If a temperature of 0° C. is exceeded at the center of the product, this usually results in burns at the surface and especially at corner locations in which heat is applied in a preferential manner.

The present invention is precisely directed to a device which overcomes this disadvantage. To this end, the invention combines the action of high-frequency radiation for reheating the product with the action of electrostatic spraying of a cryogenic liquid for maintaining the surface of the product at a low temperature and thus preventing burns.

The technique of electrostatic spraying of a cryogenic liquid is known per se, especially as disclosed in French Pat. No. 71 13294 filed on Apr. 15, 1971 and entitled "A method and apparatus for electrostatic spraying of cryogenic liquids". However, this known technique is applied to freezing or deep-freezing of agricultural food products. An electrostatic sprayer comprises a diffuser which converts the cryogenic liquid into fine droplets which are electrically charged and means for generating an electric field around the product to be treated. The droplets produced by the diffuser follow the lines of force of the electric field, strike the surface of the product to be treated and are deposited thereon in a substantially uniform manner, with the result that powerful cooling of the surface is thus ensured. The droplets also reach the hidden rear faces of the products to be treated, thus making it possible to obtain good uniformity of temperature.

In accordance with the invention, the action of high-frequency waves which has the effect of reheating the product in volume is combined with the action of elecstrostatic spraying of the cryogenic liquid which has the effect of cooling the surface. These combined actions accordingly serve to limit the temperature of the surface of the product to a suitable value while permitting rapid reheating of the interior of the product. The advantage achieved by this combination is particularly appreciable in corner zones of the product in which high-frequency waves often apply excessive heat as has already been pointed out. In fact, since the lines of force of the electrostatic field have a tendency to concentrate at corner locations in accordance with a well-known point effect, transfer of the cryogenic droplets takes place towards these zones in a preferential manner, thus compensating for the overheating which would otherwise take place in these zones as a result of high-frequency radiation.

The combined use of these two techniques in accordance with the invention accordingly makes it possible to treat frozen or deep-frozen products in such a manner as to increase the temperature of these latter to a temperature in the vicinity of or higher than 0° C. without any major difficulty, which was not usually possible in techniques of the prior art. But the practical application of the invention makes it possible in addition to obtain the following advantageous results:

practically static action of the device does not cause any drying of the products when they attain a slightly positive temperature, no dust particles, bacteria or organic residue are conveyed within the enclosures or tunnels in which the products are defrozen as is the case with blowing or agitation of cold gas, the presence of ozone which is produced by ionization of the oxygen molecules within the processing enclosure or tunnel has the effect of protecting the products against incipient oxidation or bacteriological proliferation, the deodorization which is obtained by application of an electrostatic high voltage prior to treatment of products which are liable to fix odors makes it possible to apply the defreezing technique in accordance with the invention to a very wide range of products.

More precisely, the invention is directed to a device for defreezing frozen or deep-frozen products comprising:

a furnace;

a conveyor system comprising a grounded metal support on which the products to be defrozen are mounted and on which said products are passed through said furnace by means of said conveyor system;

a generator for producing high-frequency radiation or microwave radiation and radiating elements connected to said generator, said radiating elements being distributed in said furnace around the conveyor;

means for electrostatic spraying of said products with a cryogenic liquid, said means comprising a cryogenic liquid supply, a sprayer connected to said supply by cryogenic liquid ducts and comprising a metallic rod with an opening provided with a spraying cone, a metallic disc being mounted in front of said cone on the downstream side, said rod and said disc being connected to a high electrostatic voltage source, said sprayer being mounted at the entrance of said furnace.

It is first to be noted that, in contradistinction to freezing where the cryogenic liquid flow rates are higher than 1 kilogram per minute, the aim of the invention is to carry out the spraying operation with low rates of flow (200 grams per minute). This gives rise to problems in regard to gas-liquid mixtures and in regard to efficiency of electrostatic charges at the exit of the sprayer. Although they were not considered in the French patent cited earlier, these problems have been solved in accordance with the present invention by means of a novel design of the sprayer nose.

Above all, the sprayer must operate inside the microwave furnace, in which there is a high microwave power density. It must also be designed and mounted on the one hand so as to maintain good microwave distribution and on the other hand so as to prevent damage to the sprayer under the action of the microwave energy.

In this connection, it must be pointed out that an appreciable number of the plastics normally used in cryogenic applications have a tendency to suffer degradation under the action of heating by microwaves, even in the presence of cryogenic liquids, the effect of which is merely to mask the phenomenon over a brief period. An example is provided by the French patent cited earlier, in which it was proposed to make use of this type of plastic for the sprayer body and all the seals. These drawbacks thus make it imperative to devise new methods which prove suitable for hot liquids at cryogenic temperatures and for microwave heating.

So far as the electrostatic aspect of the device is concerned, control of the flow of charged droplets and of electric charges cannot be achieved as easily as in the case of freezing operations. However, the metal supports and screens that are employed in these operations would constitute obstacles to microwaves. It is therefore necessary to ensure a suitable flow of electrostatic charges without, however, disturbing the irradiation of the products. At the same time, the shape and position of the microwave sources, which are made of metal, should be selected with a view to preventing any interference with the flow of electrostatic charges.

Indeed, faulty design of the microwave sources or wrong positioning of these latter with respect to the product and to the sprayer might cause preferential attraction of the charged particles by said sources, thus impairing the efficiency of the method.

The solutions to such problems call for the close combination of three technical fields (microwaves, cryogenics and electrostatics).

In accordance with the invention, the cryogenic liquid in the exit portion of a sprayer is caused to flow through a metal element which has been brought to a very high electrostatic voltage.

The object of such an arrangement is twofold: to convert the liquid column into a cone of atomized liquid particles, then to impart an electrostatic charge to said particles. The droplets thus charged are endowed with kinetic energy, subjected to electrostatic forces and driven towards the product. Since the product is in the vicinity of ground potential, the charged droplets are uniformly distributed over the product surface. By reason of the vaporization which takes place in contact with the product, said droplets produce an efficient and homogeneous cooling action.

Such an electrostatic effect can occur only on liquid particles and therefore not on gas molecules resulting from vaporization of the cryogenic liquid. It can thus be noted in particular that, if part of the liquid is converted to vapor or undergoes vaporization at the exit of the sprayer, it would not undergo any electrostatic effect; the refrigeration thus transferred would have the effect of cooling the atmosphere but would not contribute to cooling of the product to the same extent as charged particles.

The cooling effect thus obtained is therefore insufficient in the case of defreezing by means of microwaves, since refrigeration has to be applied to the entire surface of the product, and more especially along edges.

The spraying devices used for freezing contain insulating portions and sealing joints that can be reached by the energy of microwaves. The range of suitable materials is much smaller in the case of defreezing by means of microwaves.

Whenever droplets are deposited on the products, the charges transferred are deposited in like manner. In order to prevent the product from being progressively charged and thus repelling the falling droplets, it is necessary to provide a suitable flow of charges. In a freezing operation, the product is placed on plastic materials which contain a certain proportion of conducting substances (e.g. carbon). Such materials cannot be used in a microwave furnace.

In order to ensure that the electrostatic effect takes place in the desired manner, the potential distribution within the processing enclosure has to be such as to allow the charged particles to reach the product. Should it happen in particular that, during transit from the sprayer to the product, charged particles in the vicinity of a metallic portion of the enclosure are at a potential which is not very different from that of the product, such particles will be deflected towards that portion of the enclosure and will therefore not reach the product. Such a problem is not encountered in a freezing chamber, in which the distribution of the products, of the spraying devices and of metal parts does not constitute any hindrance.

Solely by way of explanation and without any limitation being implied, three embodiments of the device in accordance with the invention are illustrated in the accompanying drawings, wherein.

Figure 1:
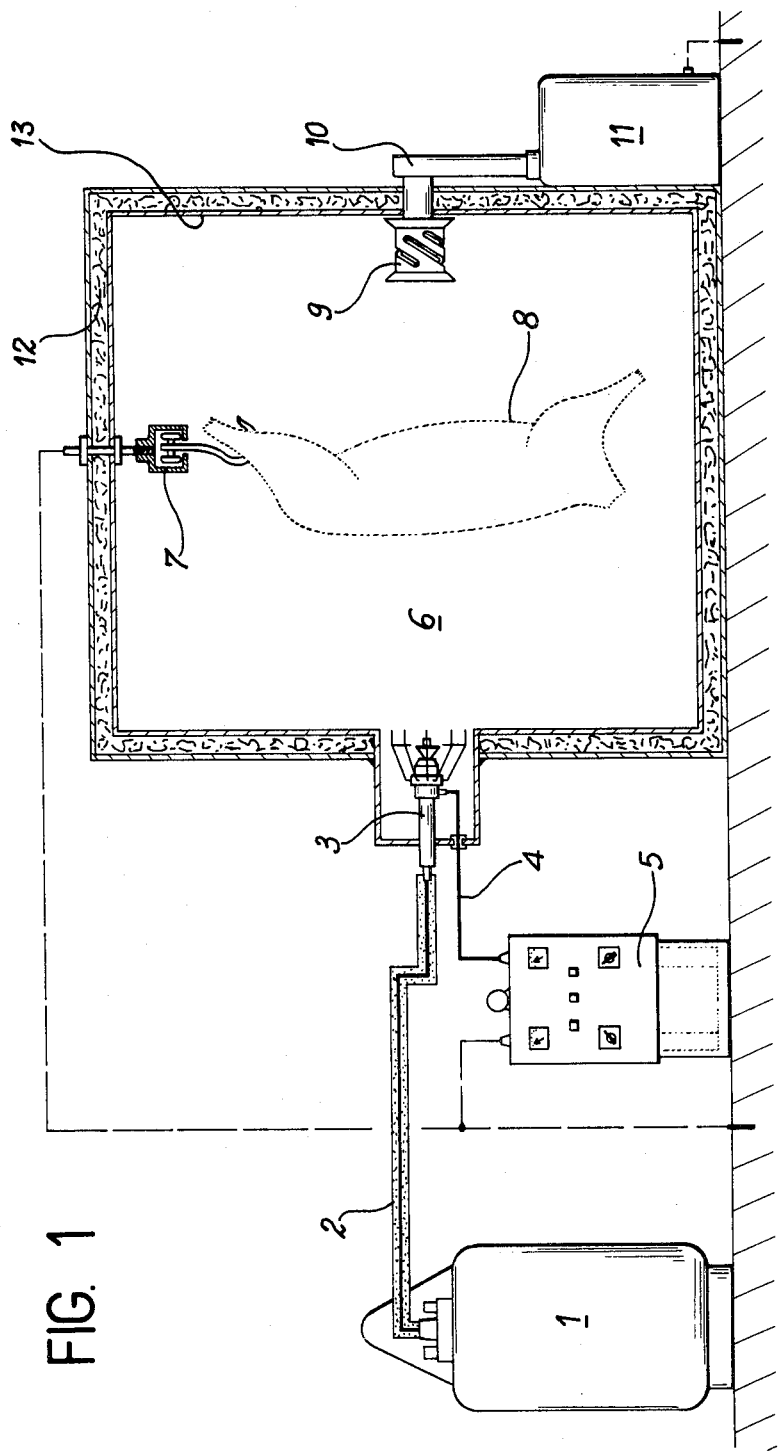
FIG. 1 shows an installation for defreezing large suspended masses.

In FIG. 1, a reverse 1 of cryogenic liquid (liquid nitrogen, for example) is connected to a cryogenic line 2 which supplies a cryogenic liquid sprayer 3, said sprayer being connected through the lead 4 to a high-voltage generator 5. The defreezing chamber 6 comprises a hooking system 7 from which the mass 8 of agricultural food product to be processed is suspended. The high-frequency or microwave radiation is emitted within the chamber by means 9 supplied by a wave guide 10 which is connected to a high-frequency or microwave generator 11. A heat-insulating packing 12 of polyurethane, for example, is placed around metallic walls 13 which constitute the defreezing chamber.

Figure 2:
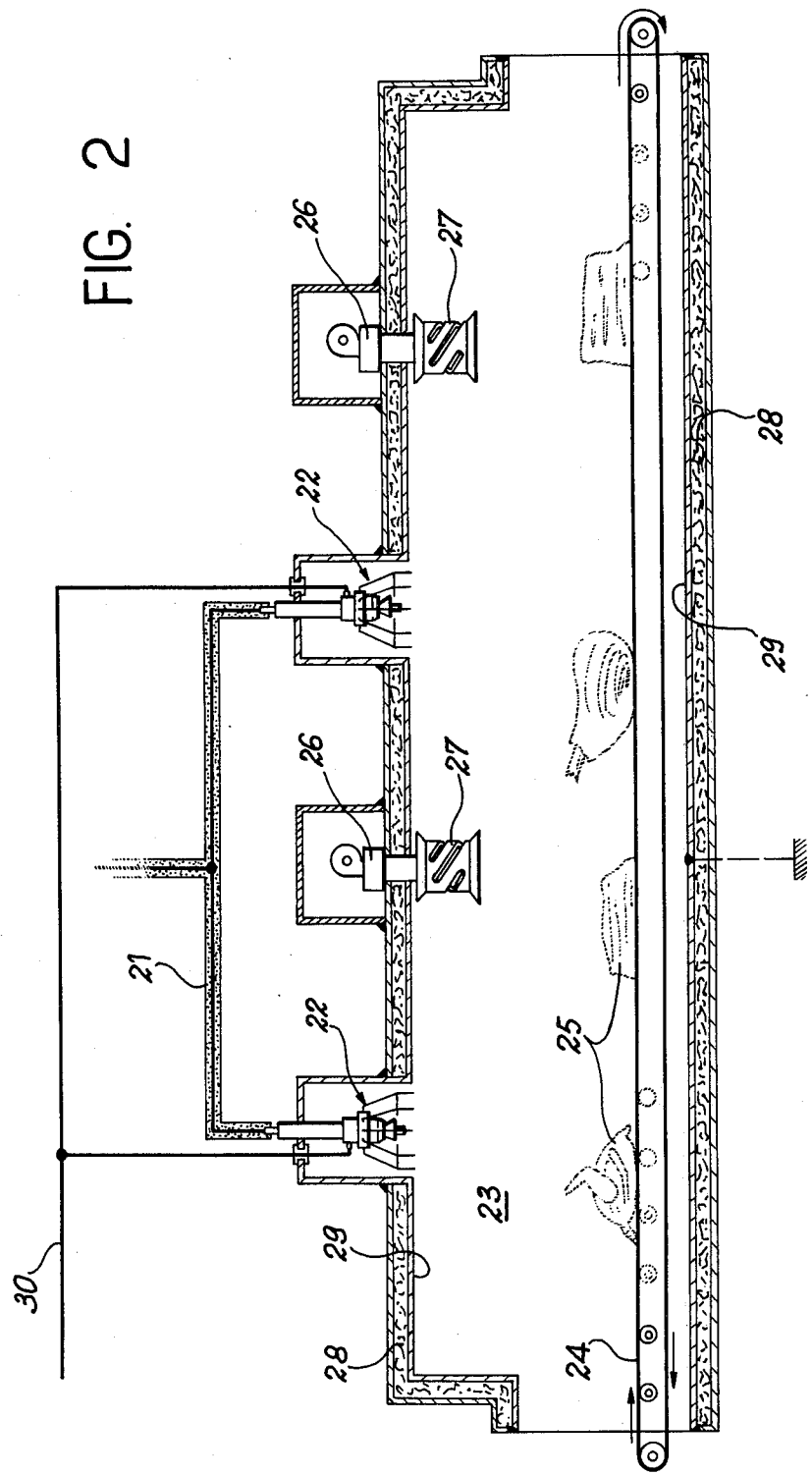
FIG. 2 shows an installation for defreezing small masses with a horizontal conveyor.

In FIG. 2, the installation which is illustrated comprises a cryogenic line 21, a plurality of electrostatic sprayers 22 which open into a defreezing tunnel 23 fitted with a horizontal conveyor system 24 for supporting the products 25 to be processed. The means for exposing the products to the microwave radiation comprise a waveguide 26 which terminates in a radiating element 27 and is supplied by a microwave generator (not shown in the drawings). A heat-insulating packing 28 formed especially of polurethane surrounds the metallic walls 29 of the tunnel. The line 30 is a conductor which serves to connect the spraying devices to the very-high-voltage generator (not shown in the drawings. The direct-current high voltage employed for the spraying operation can be of the order of 100 kV.

The sprayer as designed for freezing operations is operated with flow rates of several kilograms of cryogenic liquid per minute. Under these conditions, a liquid column can readily be delivered to the spraying unit by means of a conventional cryogenic liquid generating installation. Moreover, by reason of the high rate of flow of liquid, the fraction of said liquid which is vaporized at the sprayer unit is substantially negligible and, in any case, does not affect the performance of the installation to any appreciable extent.

Figure 3:
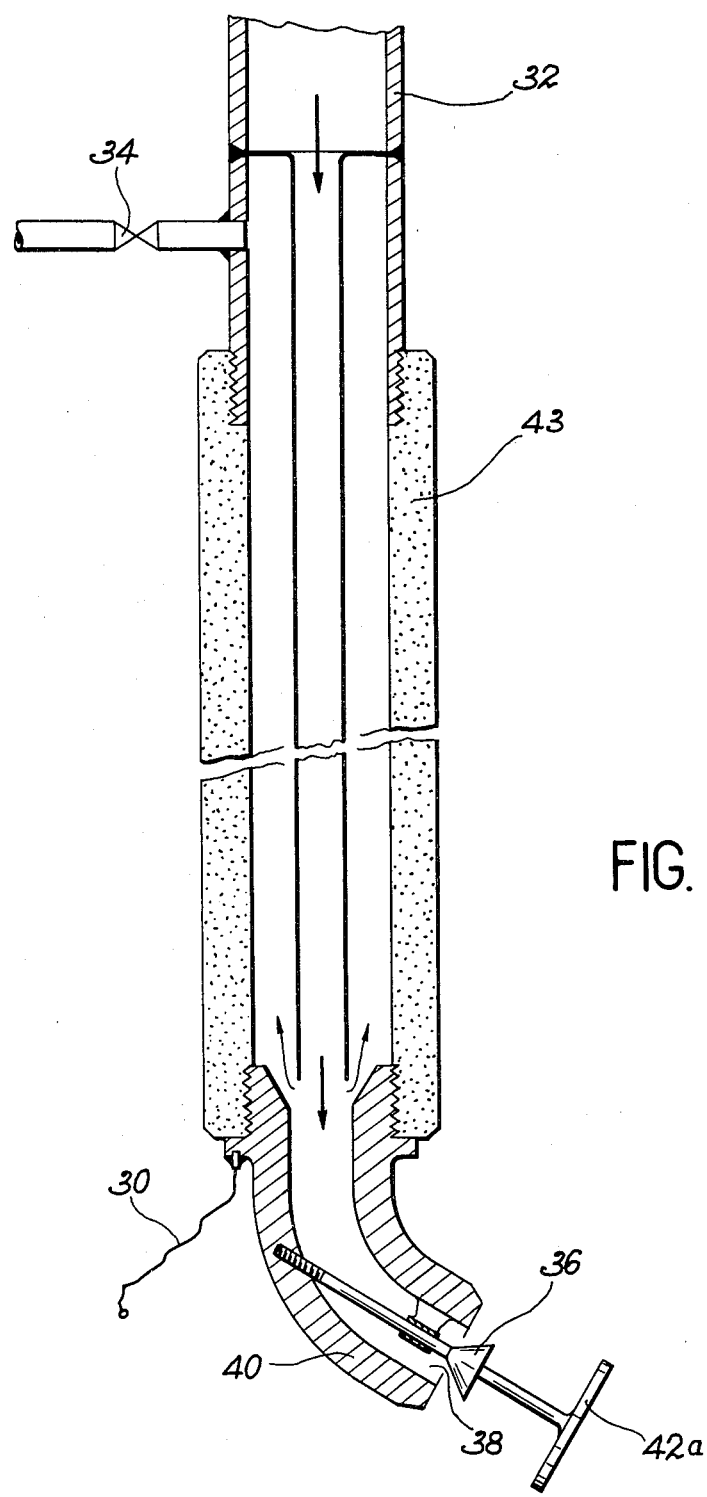
FIG. 3 shows a preferred embodiment of a sprayer used for defreezing.

The sprayer used for defreezing by means of microwaves as illustrated in FIG. 3 comprises cryogenic liquid ducts 32 of small diameter, thus making it necessary to provide an adjustable degassing system 34 which ensures the presence of liquid at the level of a spraying cone 36. The opening 38 at the level of the spraying cone 36 is very small and said cone is integral with an inclined metallic rod 40 in order to provide the best possible alignment. Preferably, the flow rate is regulated by adjusting the pressure in the cryogenic liquid feed line. By reason of the low and small angle of inclination of the sprayer, the jet of droplets about the cone is not perfectly uniform. A metal disc 42a mounted at a distance of a few centimeters in front of the cone and connected to the high electrostatic voltage through the rod 40 permits a more uniform distribution of droplets on the jet cone.

The sprayer no longer contains any sealing joint. An insulating portion 43 is made of Teflon (PTFE) whilst the lower portion is entirely of metal and brought to the high electrostatic voltage. Deformations of the various components at cryogenic temperatures are compatible with stable and reproducible adjustments and perfect imperviousness to cryogenic liquids.

Figure 4:
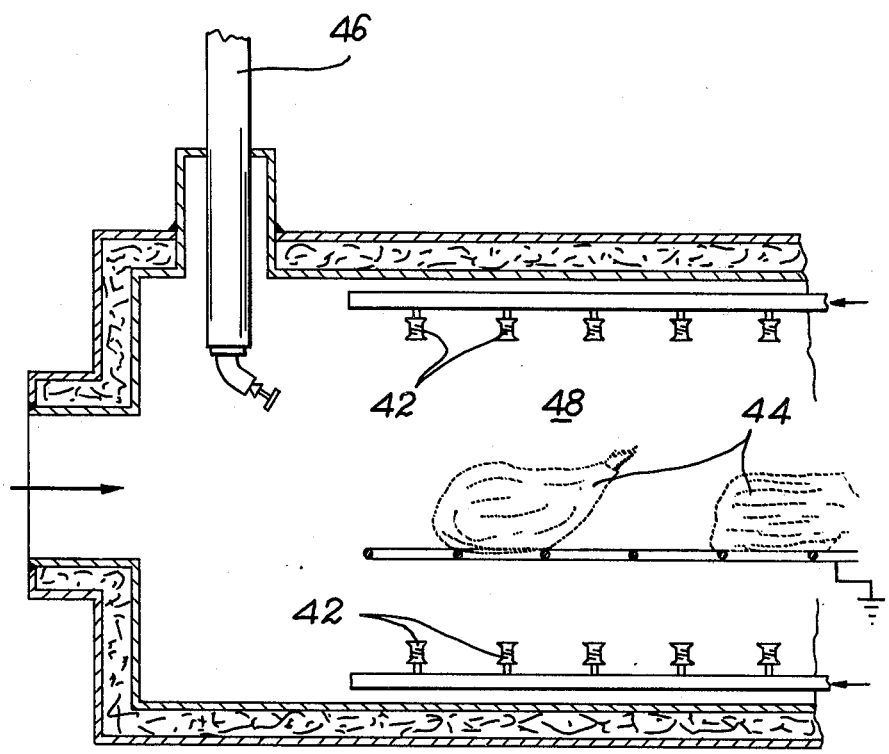
FIG. 4 shows a defreezing installation which utilizes said sprayer.

Homogeneity of the microwave energy density on the surface of the product is of primary importance. For this reason, irradiation is performed by means of a plurality of microwave radiating elements 42 distributed over a cylindrical surface that surrounds the product 44 as illustrated in FIG. 4. In order not to hinder the propagation of waves towards the product, a sprayer 46 is mounted on one side of the microwave irradiation zone. This explains why the sprayer axis is not vertical in this embodiment.

Since the product must be capable of moving within the furnace 48 in continuous operation, the sprayer 46 has to be mounted above the product in a withdrawn position. The jet axis is inclined to the horizontal at an angle of a few degrees (smaller than 10°). Such a design calls for perfect spraying and a very good electrostatic effect since the product is not located directly beneath the sprayer. This latter does, however, remain subjected to the microwave radiation. Accordingly, the only suitable materials are transparent insulating materials which are capable of sustaining high electostatic voltage and cryogenic temperatures without any attendant danger of failure, as well as non-magnetic metal.

The product support is directly subjected to irradiation by microwaves. It cannot be made from usual materials, since the latter absorb microwaves and are thus caused to melt.

By virtue of this arrangement, electrostatic spraying permits a substantial economy of cryogenic liquid and is conducive to rapid cooling. Special attention has therefore to be paid to the need for a fairly high flow of the charges brought to the product by the droplets. In point of fact, the electrical conductivity of microwave-transparent insulating substances is far too low to ensure good flow of the charges. For this reason the product should be mounted on a grounded metal support. Since microwaves are reflected by metals, use is made of a "grid" constituted by uniformly spaced metal bars. The spacing of the microwave sources and of said bars in such that the "grid" is transparent to microwaves and does not impair product irradiation.

In each embodiment, the means for producing radiation are oscillators of any type (of the tube type, magnetron type or klystron type, for example). The frequency is either within the range usually designated as the high-frequency range (27 MHz, for example) or within the microwave-frequency range (915 MHz or 2450 MHz, for example).

The means for applying the radiation to the product are either capacitors having full plates or latticework plates, or rod-type electrodes or waveguides or cavities or any other suitable means.

The source of cryogenic liquid can be provided by cylinders or containers under pressure or by condensers placed near the processing device.

By way of example, the cryogenic liquid can be liquid nitrogen or Freon such as Freon R12, for example. However, any other cryogenic liquid is suitable for the purpose.

We claim:

1. A device for defreezing frozen or deep-frozen products comprising:
   a furnace;
   a conveyor system comprising a grounded metal support on which the products to be defrozen are mounted and on which said products are passed through said furnace by means of said conveyor system;
   a generator for producing high-frequency radiation and radiating elements connected to said generator, said radiating elements being distributed in said furnace around the conveyor;

means for electrostatic spraying of said products with a cryogenic liquid, said means comprising a cryogenic liquid supply, a sprayer including a cryogenic liquid duct connected to said supply, the distal portion of said duct constituting a bent metallic rod with an opening provided with a spraying cone, a metallic disc being mounted in front of said cone on the downstream side, said rod, said cone, and said disc being connected to a high electrostatic voltage source, said opening being adapted to receive a substantially liquid flow of the cryogenic liquid, said disc cooperating with said cone to disperse the cryogenic liquid into a substantially uniform jet of droplets, said sprayer being mounted at the entrance of said furnace.

2. A device according to claim 1, wherein the rod of said sprayer has an axis inclined at an angle of a few degrees, with respect to the axis of the furnace, in a forward direction with respect to the motion of the products.

3. A device according to claim 1, wherein cryogenic liquid flows through the sprayer at a flow rate lower than 1 kilogram per minute.

* * * * *